United States Patent
Stellick (10) Patent No.: US 10,135,254 B2
(45) Date of Patent: Nov. 20, 2018

(54) HIGH RELIABILITY POWER OVER ETHERNET

(71) Applicant: Allied Telesis Holdings Kabushiki Kaisha, Tokyo (JP)

(72) Inventor: Daniel Stellick, Geneva, IL (US)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 894 days.

(21) Appl. No.: 13/767,861

(22) Filed: Feb. 14, 2013

(65) Prior Publication Data

US 2013/0207454 A1 Aug. 15, 2013

Related U.S. Application Data

(60) Provisional application No. 61/599,272, filed on Feb. 15, 2012.

(51) Int. Cl.
*H02J 4/00* (2006.01)
*H04L 12/10* (2006.01)

(52) U.S. Cl.
CPC ............ *H02J 4/00* (2013.01); *H04L 12/10* (2013.01)

(58) Field of Classification Search
CPC ................................. H02J 4/00; H04L 12/10
See application file for complete search history.

(56) References Cited

U.S. PATENT DOCUMENTS

| | | | | |
|---|---|---|---|---|
| 2008/0294917 A1* | 11/2008 | Khan | ............... | G06F 1/3209 713/310 |
| 2011/0057518 A1* | 3/2011 | Gilbert | ............... | G06F 1/266 307/112 |
| 2011/0077793 A1* | 3/2011 | Hsieh | ............... | H04L 12/10 700/297 |
| 2012/0089855 A1* | 4/2012 | Beckhoff | ............... | G06F 1/30 713/340 |
| 2012/0131372 A1* | 5/2012 | Hibi | ............... | H04L 12/10 713/340 |
| 2013/0002024 A1* | 1/2013 | Beg | ............... | H02J 9/061 307/64 |

* cited by examiner

*Primary Examiner* — Daniel Kessie
(74) *Attorney, Agent, or Firm* — Brooks Acordia IP Law, PC; Michael Zarrabian (57) ABSTRACT

A method includes receiving a signal to maintain uninterrupted power to a device over a power over Ethernet line. The power over Ethernet line is configured to carry data and power. Power delivery is maintained for the device regardless of a power disruptive event associated with a power source device. Carrying the power to the device over the power over Ethernet line is interrupted in absence of the receiving the signal. According to one embodiment, the signal is generated in response to a user command or it may be generated from the device automatically. The signal may classify the device as a critical device. The power disruptive event may include initialization of a data path, alteration to a data path associated with the power over Ethernet line, a software update associated with the power source device, reset of power source device, etc.

18 Claims, 7 Drawing Sheets

HIGH RELIABILITY POWER OVER ETHERNET

RELATED APPLICATIONS

This application claims the benefit of and priority to the U.S. provisional patent application No. 61/599,272, filed on Feb. 15, 2012, by the same inventor, Daniel Stellick.

BACKGROUND

In general, transmitting data and power over the same line may reduce cost by using the same cable and the same conductors. However, data and power transmission over the same line creates co-dependency between a device and its power source device. In other words, an issue impacting the power source device, e.g., initialization, data path initialization, software update, configuration, re-configuration, etc., may also impact the device by disabling power transmission to that device.

Disabling power delivery to certain devices may be detrimental to their intended purpose, e.g., security devices, networking devices, devices related to human safety, biometric access, etc. Furthermore, disabling power delivery may result in data loss, e.g., information may not have been committed in a storage redundant array of independent disks (RAID) controllers, results from processing information may not have been stored, etc.

Some may utilize an independent power system, e.g., battery installed locally, to sensitive devices in order to maintain power despite their co-dependency on their respective power source device. Unfortunately, utilizing an independent power system, in addition to the power source device providing power through power over Ethernet, is costly.

SUMMARY

Accordingly, a need has arisen to maintain power to a sensitive device using a power source device that is coupled to the sensitive device via a power over Ethernet line. Moreover, a need has arisen to maintain power to the sensitive device without using an independent power system, e.g., battery. It is advantageous to maintain power to a sensitive device despite power disruptive events, e.g., initialization, data path initialization, software update, configuration, re-configuration, power source device reset, etc., impacting the power source device that provides power to the sensitive device.

According to one embodiment, a power source device is coupled to a sensitive device via power over Ethernet line. In general, the sensitive device and the power source device are in constant communication with one another by transmitting handshaking signals. Handshaking signals may provide relevant information needed for data transmission. Moreover, handshaking signals may provide relevant information regarding the sensitive device, e.g., power requirement, classification, etc. Accordingly, configuration information related to the sensitive device may be stored in the power source device. Based on the classification of the device, e.g., detected automatically, or in response to a triggering event, e.g., user command, the sensitive device may be identified as a critical device such that power to the critical device is to be maintained indefinitely or for a certain period of time.

In one embodiment, the configuration information associated with the sensitive device may be updated such that power to the critical device is maintained despite power disruptive events, e.g., initialization of power source device, data path initialization, software update associated with the power source device, configuration of the power source device, re-configuration of the power source device, reset of power source device, etc. It is appreciated that updated configuration information may bypass handshaking signals between the two devices such that both devices are unaware and agnostic to power disruptive events. As such, despite occurrence of power disruptive events associated with the power source device, power to the critical device is maintained via power over Ethernet line and without using an independent power system such as a battery.

According to one embodiment, a switch is coupled to the power source device. A controller of the power source device may issue a signal to disable power to the critical device over the power over Ethernet line. The disabling signal may be received by the switch. However, the switch may also receive a signal, e.g., a user command, a signal from the critical device indicating that it is a critical device and power is to be maintained, a signal from the critical device classifying it as a critical device, etc., indicating that the disabling signal from the controller is to be overwritten and that the power to the critical device is to be maintained. It is appreciated that a multiplexer may be used in order to overwrite the disabling signal from the controller. Accordingly, despite occurrence of power disruptive events associated with the power source device, power to the critical device is maintained via power over Ethernet line and without using an independent power system such as a battery.

In one embodiment, a method includes receiving a signal to maintain uninterrupted power to a device over a power over Ethernet line, wherein the power over Ethernet line is configured to carry data and power. The method may further include maintaining power to the device over the power over Ethernet line regardless of a power disruptive event associated with a power source device, wherein carrying the power to the device over the power over Ethernet line is interrupted in absence of the receiving the signal.

According to one embodiment, the signal is generated in response to a user command. It is appreciated that in one embodiment, the signal classifies the device as a critical device, and wherein the signal is transmitted from the device, e.g., automatically, in response to a user command, periodically, etc., to the power source device. The power disruptive event may include initialization of a data path, alteration to a data path associated with the power over Ethernet line, a software update associated with the power source device, etc.

The method may further include transmitting handshaking signals via the power over Ethernet line coupling the device to the power source device, wherein the handshaking signals comprise information associated with a data path for transmission of data between the device and the power source device, and wherein the handshaking signals comprise information regarding power requirement of the device.

In one embodiment, a device may include a controller, a port and a memory component. The port may be configured to couple the device to another device via a power over Ethernet line configured to carry data and power between the device and the another device. The memory component is operable to store configuration information associated with the another device. The configuration information may comprise power requirements associated with the another device, in one instance. It is appreciated that in one embodiment, an updated information is generated in response to receiving a signal to maintain uninterrupted power to the another device over the power over Ethernet line regardless of a power disruptive event associated with the device. In one exemplary embodiment, carrying the power to the another device over the power over Ethernet line is interrupted in absence of the receiving the signal.

According to one embodiment, the signal is generated in response to a user command. In one exemplary embodiment, the signal classifies the another device as a critical device, and wherein the signal is transmitted from the another device to the device over the power over Ethernet line.

It is appreciated that according to one exemplary embodiment, the power disruptive event includes one of initialization of a data path, a software update associated with the device, alteration to a data path associated with the power over Ethernet line.

The device, in one embodiment, may further include a switch coupled to the port. The switch is operable to receive a disabling signal from the controller to disable carrying power of the power over Ethernet line to the another device in response to the power disruptive event. The switch is further operable to overwrite the disabling signal from the controller in response to the updated information.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "determining," "sending," "receiving," "transmitting," "communicating," "providing," "accessing," "associating," "disabling," "enabling," "configuring," "initiating," "starting," "terminating," "ending," "maintaining," "overwriting," "initializing," "updating" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

According to one embodiment, a power source device is coupled to a sensitive device via power over Ethernet line. In general, the sensitive device and the power source device are in constant communication with one another by transmitting handshaking signals. Handshaking signals may provide relevant information need for data transmission. Moreover, handshaking signals may provide relevant information regarding the sensitive device, e.g., power requirement, classification, etc. Accordingly, configuration information related to the sensitive device may be stored in the power source device. Based on the classification of the device, e.g., detected automatically, or in response to a triggering event, e.g., user command, the sensitive device may be identified as a critical device such that power to the critical device is to be maintained indefinitely or for a certain period of time.

In one embodiment, the configuration information associated with the sensitive device may be updated such that power to the critical device is maintained despite power disruptive events, e.g., initialization of power source device, data path initialization, software update associated with the power source device, configuration of the power source device, re-configuration of the power source device, reset of the power source device, etc. It is appreciated that updated configuration information may bypass handshaking signals between the two devices such that both devices are unaware and agnostic to power disruptive events. As such, despite occurrence of power disruptive events associated with the power source device, power to the critical device is maintained via power over Ethernet line and without using an independent power system such as a battery.

According to one embodiment, a switch is coupled to the power source device. A controller of the power source device may issue a signal to disable power to the critical device over the power over Ethernet line. The disabling signal may be received by the switch. However, the switch may also receive a signal, e.g., a user command, a signal from the critical device indicating that it is a critical device and power is to be maintained, a signal from the critical device classifying it as a critical device, etc., indicating that the disabling signal from the controller is to be overwritten and that the power to the critical device is to be maintained. It is appreciated that a multiplexer may be used in order to overwrite the disabling signal from the controller. Accordingly, despite occurrence of power disruptive events associated with the power source device, power to the critical device is maintained via power over Ethernet line and without using an independent power system such as a battery.

Figure 1:
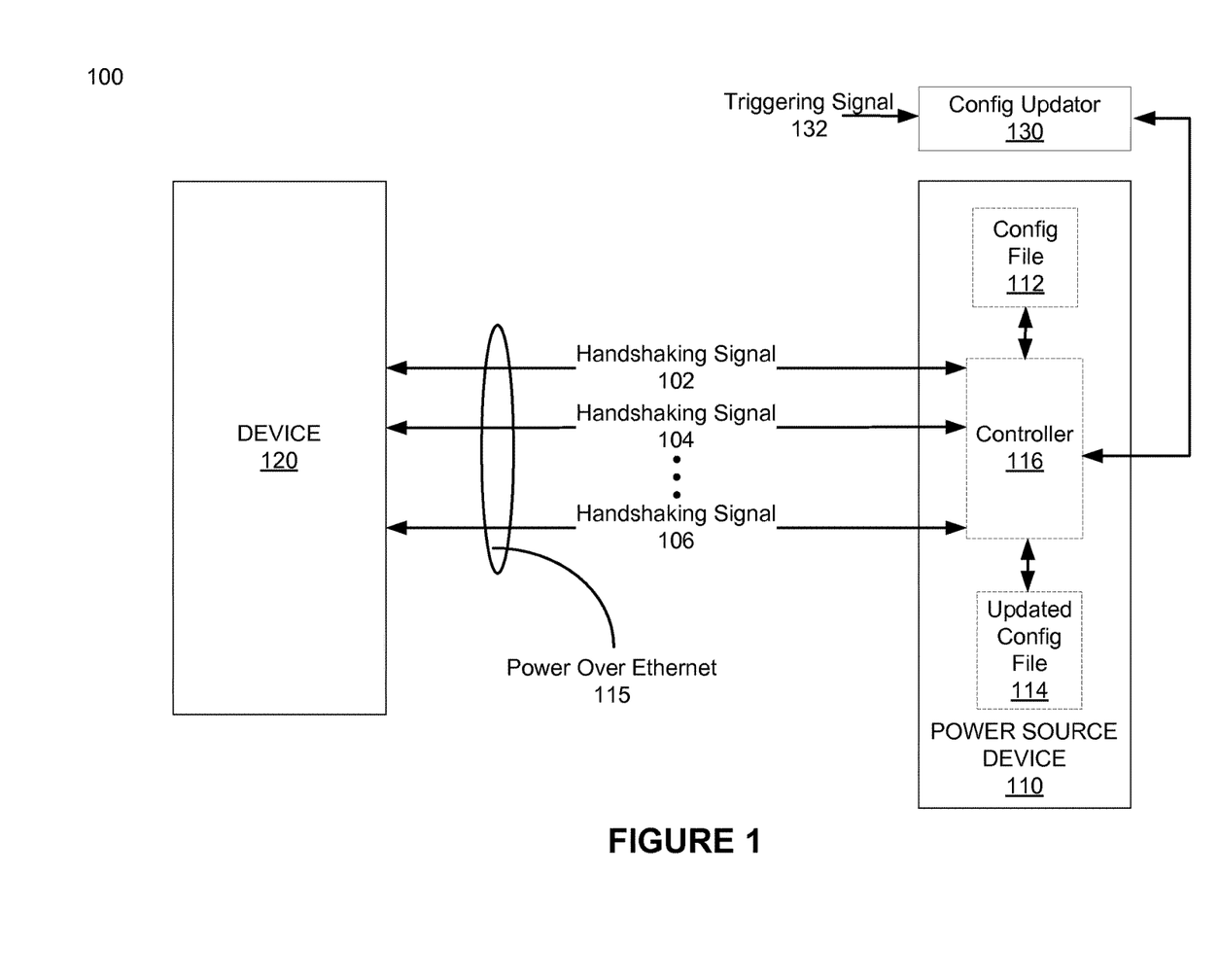
FIG. 1 shows an exemplary power over Ethernet line system according to one embodiment.

Referring now to FIG. 1, an exemplary power over Ethernet line system 100 according to one embodiment is shown. System 100 includes a power source device 110 that is coupled to a device 120 via power over Ethernet line 115. The power over Ethernet line 115 is configured to facilitate data communication between the power source device 110 and the device 120. The power over Ethernet line 115 is also configured to deliver power from the power source device 110 to the device 120. The power source device 110 may be a network device that is configured to provide power to device 120.

According to one embodiment, the power source device 110 may include a controller 116 as well as one or more ports (not shown). The one or more ports may be used to couple the power source device 110 to the device 120 as well as other devices (not shown). The controller 116 may be in communication with device 120. For example, a plurality of handshaking signals 102, 104, . . . , 106 may be communicated between the power source device 110 and device 120. Moreover, data communication may occur between the two devices after proper configuration and initialization. It is appreciated that the handshaking signals may be communicated continuously, periodically, or aperiodically and based on some triggering event.

For illustrative purposes, it is presumed that the handshaking signal 102 is the first handshaking signal communicated between the power source device 110 and the device 120. The handshaking signal 102 may include information regarding initialization of the data path for the power over Ethernet line 115. Moreover, the handshaking signal 102 may include information regarding each device, e.g., information regarding the power requirement of device 120, classification of device 120, information regarding the power source device 110, etc.

The handshaking signal 102 may be used for detection and classification of protocol before providing power from the power source device 110 to device 120. It is appreciated that device classification may indicate the power requirement for the device. For example, class 0 may indicate power requirement for providing up to 12.95 W, class 1 may indicate power requirement for providing 3.84 W, class 2 may indicate power requirement for providing 6.49 W, class 3 may indicate power requirement for providing 12.95 W, and class 4 may indicate power requirement for providing 25.5 W.

In one embodiment, configuration information, e.g., a configuration file 112, may be generated and stored by the power source device 110 in its memory component (not shown). It is appreciated that the configuration file 112 may be generated in response to the handshaking signal 102. However, it is appreciated that the configuration file 112 may be generated and stored independently from the handshaking signal 102. The configuration file 112 may be used by the controller 116 in order to control data communication between device 120 and the power source device 110 as well as to control power delivery from the power source device 110 to device 120.

It is appreciated that conventionally, a change associated with the power source device 110 (generally referred to as a power disruptive event, e.g., initialization of power source device, data path initialization, software update associated with the power source device, configuration of the power source device, re-configuration of the power source device, reset of the power source device, etc.) would have caused power delivery disruption to device 120. However, the configuration file 112 may be updated to generate an updated configuration file 114 in response to receiving a triggering signal 132, indicating that device 120 is a critical device and its power is to be maintained, e.g., for a predetermined amount of time, indefinitely, etc., regardless of any power disruptive events. It is appreciated that a power disruptive event may be any event, which may cause delivery of power to device 120 to be disrupted, other than shutting down of power source device 110.

According to one embodiment, a configuration updator 130 may receive the triggering signal 132. According to one exemplary embodiment, the triggering signal 132 is user initiated, e.g., a user command. However, the triggering signal 132 may be automatically generated by one or more other devices that identify device 120 as a critical device. It is appreciated that the triggering signal 132 may be generated by device 120.

The configuration updator 130 may generate a command signal for the controller 116 to update the configuration file 112 in order to generate the updated configuration file 114 and store it in a memory component (not shown). The updated configuration file 114 may be used by the controller 116 to control data communication between device 120 and the power source device 110 as well as to control power delivery from the power source device 110 to device 120. The updated configuration file 114 may overwrite previous handshaking schemes such that the power source device 110 and the device 120 remain agnostic to any power disruptive events. As such, regardless of any power disruptive events, power delivery from the power source device 110 to the device 120 is maintained unlike the conventional system where a power disruptive event causes power disablement. In other words, the conventional handshaking scheme is bypassed with a new one, e.g., handshaking signals 104 through 106, to maintain power delivery to the critical device 120. It is appreciated that in one embodiment, maintaining power delivery from the power source device 110 to the device 120 is programmable and may be maintained for any period of time, e.g., a predetermined amount of time, indefinitely, maintained for a predetermined amount of time before reverting back to the original configuration and reverting back to the updated configuration and maintaining power for a different period of time, etc.

Figure 2:
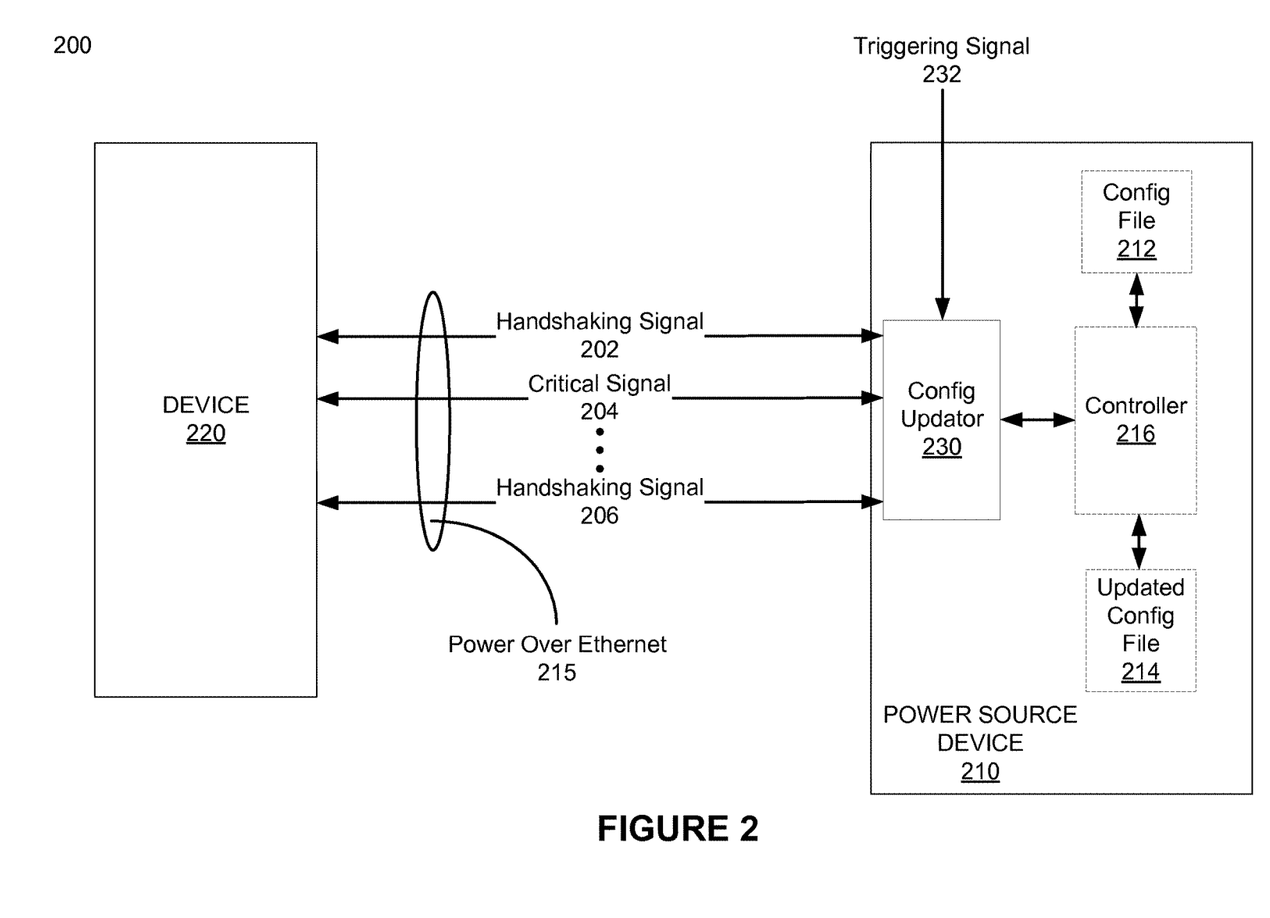
FIG. 2 shows an exemplary system for maintaining power to a critical device in accordance with one embodiment.

Referring now to FIG. 2, an exemplary system 200 for maintaining power to a critical device in accordance with one embodiment is shown. System 200 functions similar to that of system 100 except that the configuration updator module 230 resides within the power source device 210. The configuration updator module 230 may receive the triggering signal 232, e.g., from a user, from an external device, etc., indicating that device 220 is a critical device and power delivery to it should be maintained regardless of any power disruptive events. The configuration updator module 230 may also receive a critical signal 204 from device 220 indicating that it is a critical device and power delivery to it should be maintained regardless of any power disruptive events.

Figure 3:
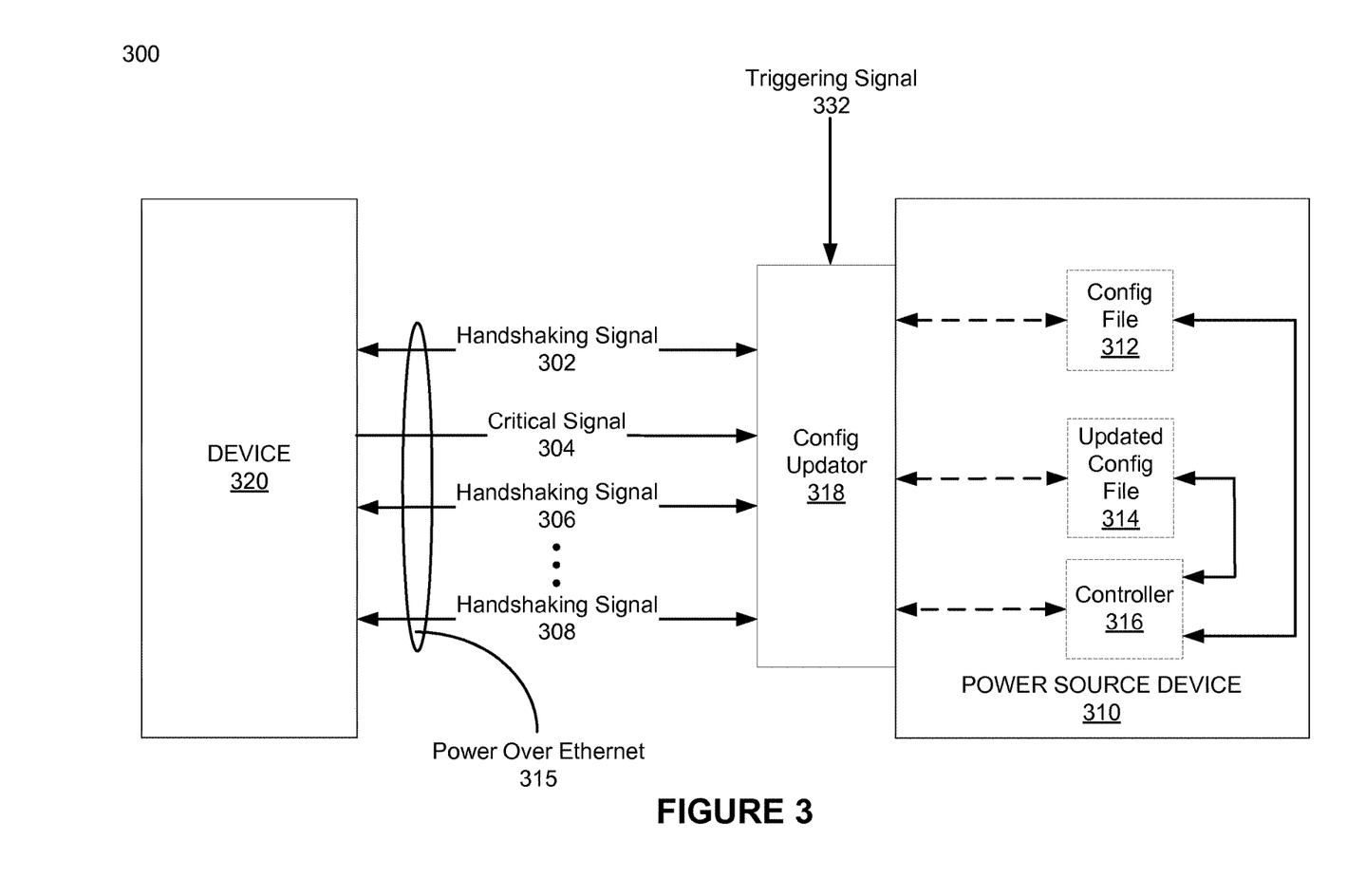
FIG. 3 shows an exemplary power source device for maintaining power to a critical device via a power over Ethernet line in accordance with one embodiment.

Referring now to FIG. 3, an exemplary power source device for maintaining power to a critical device via a power over Ethernet line in accordance with one embodiment is shown. System 300 of FIG. 3 operates substantially similar to that of FIG. 2 except that system 300 shows different ways that the power source device 310 can operate. For example, power source device 310 may receive triggering signal 332 and/or critical signal 304 through the configuration updator module 318 that is coupled to the power source device 310. The configuration updator module 318 may communicate handshaking signals, data, triggering signal 332, critical signal, etc., with the controller 316. The controller 316 may in turn generate the configuration file 312 and/or updated configuration file 314. The configuration file 312 or the updated configuration file 314 may be used by the controller 316 to communicate data and/or carry power over the power over Ethernet 315 line.

In one embodiment, the information such as the triggering signal 332 and/or the critical signal 304, handshaking signals, etc., are not communicated to the controller 316. Instead, the configuration updator module 318 may generate the configuration file 312 and/or updated configuration file 314 without communicating them to the controller 316. The generated configuration file 312 and/or updated configuration file 314 may be used to control the manner of which the controller 316 communicates and/or supplies power to device 320 via power over Ethernet 315 line.

Figure 4:
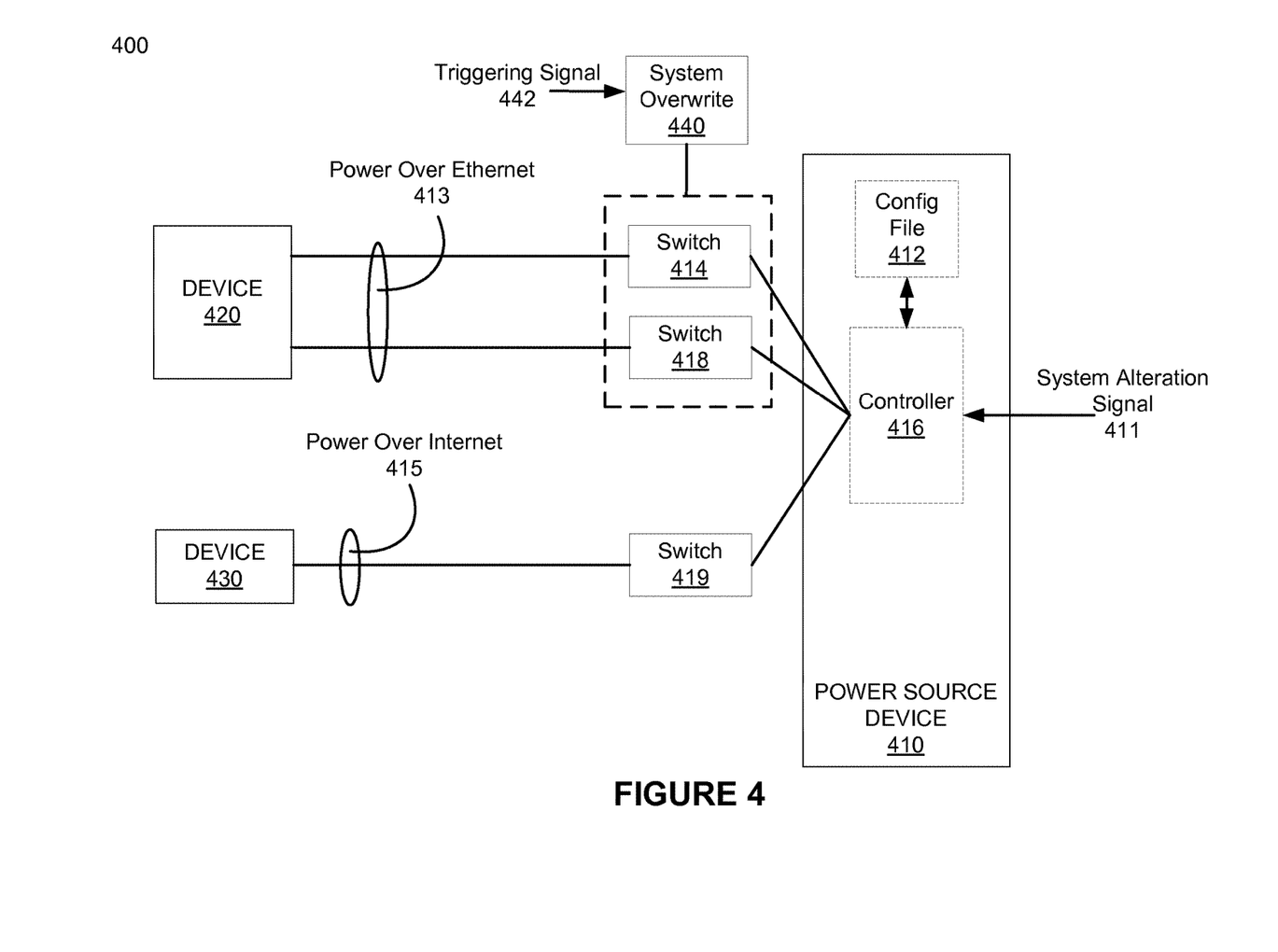
FIG. 4 shows an exemplary implementation of a power source device for maintaining power to a critical device via a power over Ethernet line in accordance with one embodiment.

Referring now to FIG. 4, an exemplary implementation of a power source device for maintaining power to a critical device via a power over Ethernet line in accordance with one embodiment is shown. System 400 includes a power source device 410 configured to provide power to devices 420 and 430 via power over Ethernet lines 413 and 415.

The power source device 410 includes a controller 416. Similar to previous embodiments, devices 420 and 430 are in communication with the power source device 410, e.g., handshaking signals, data communication, critical signal, etc. Configuration file 412 may be generated and stored by the power source device 410. The configuration file 412 may store relevant information about each device, e.g., classification, power requirement, data path initialization, etc. The configuration file 412 may be used by the controller 416 to communicate handshaking signals, data signals, etc., between the power source device 410 and devices 420 and 430. The power source device 410 may also include a plurality of switches 414, 418, and 419 coupled to their respective ports (not shown).

Power delivery from the power source device 410 to devices 420 and 430 is disrupted if the power source device 410 detects a system alteration signal 411, e.g., initialization of power source device, data path initialization, software update associated with the power source device, configuration of the power source device, re-configuration of the power source device, reset of the power source device, etc. It is appreciated that the system alteration signal 411 is a signal detecting a power disruptive event, which is any event that may cause delivery of power to devices 420 and 430 to be disrupted, other than shutting down of power source device 410.

It is appreciated that in this exemplary embodiment and for illustrative purposes only, it is presumed that prior to occurrence of a power disruptive event, a triggering signal 442 is transmitted and received by a system overwrite module 440. The triggering signal 442 may be user generated, e.g., user command, and/or device generated, e.g., generated by device 420, indicating that device 420 is a critical device and that its power is to be maintained uninterrupted. The system overwrite module 440 may send a command to switches 414 and 418 of the power source device 410 that are associated with device 420.

Once a power disruptive event occurs, system alteration signal 411 may be detected and transmitted from the controller 416 to switches 414 and 418 to disable power delivery to device 420. However, switches 414 and 418 have also received a signal from the system overwrite module 440 indicating that device 420 is a critical device and its power should remain uninterrupted. As such, the system alteration signal 411 indicating that power should be disabled is overwritten by the signal from the system overwrite module 440.

It is appreciated that in one implementation one or more multiplexers may be used to overwrite the system alteration signal 411 with a signal from the system overwrite module 440. In a meanwhile, switch 419 associated with device 430 does not receive a signal indicating that device 430 is a critical device and that its power is to remain uninterrupted. As such, the system alteration signal 411 communicated via the controller 416 to the switch 419 disables power delivery from the power source device 410 to device 430.

It is appreciated that overwriting a power disruptive event using system overwrite module 440 may be programmable. For example, the system overwrite 440 may overwrite the power disruptive event for a predetermined amount of time, for a predetermined amount of times (time ranges), etc. As such, power delivery to a critical device is uninterrupted, in contrast to a standard device wherein power delivery is not essential and therefore may be interrupted.

Figure 5:
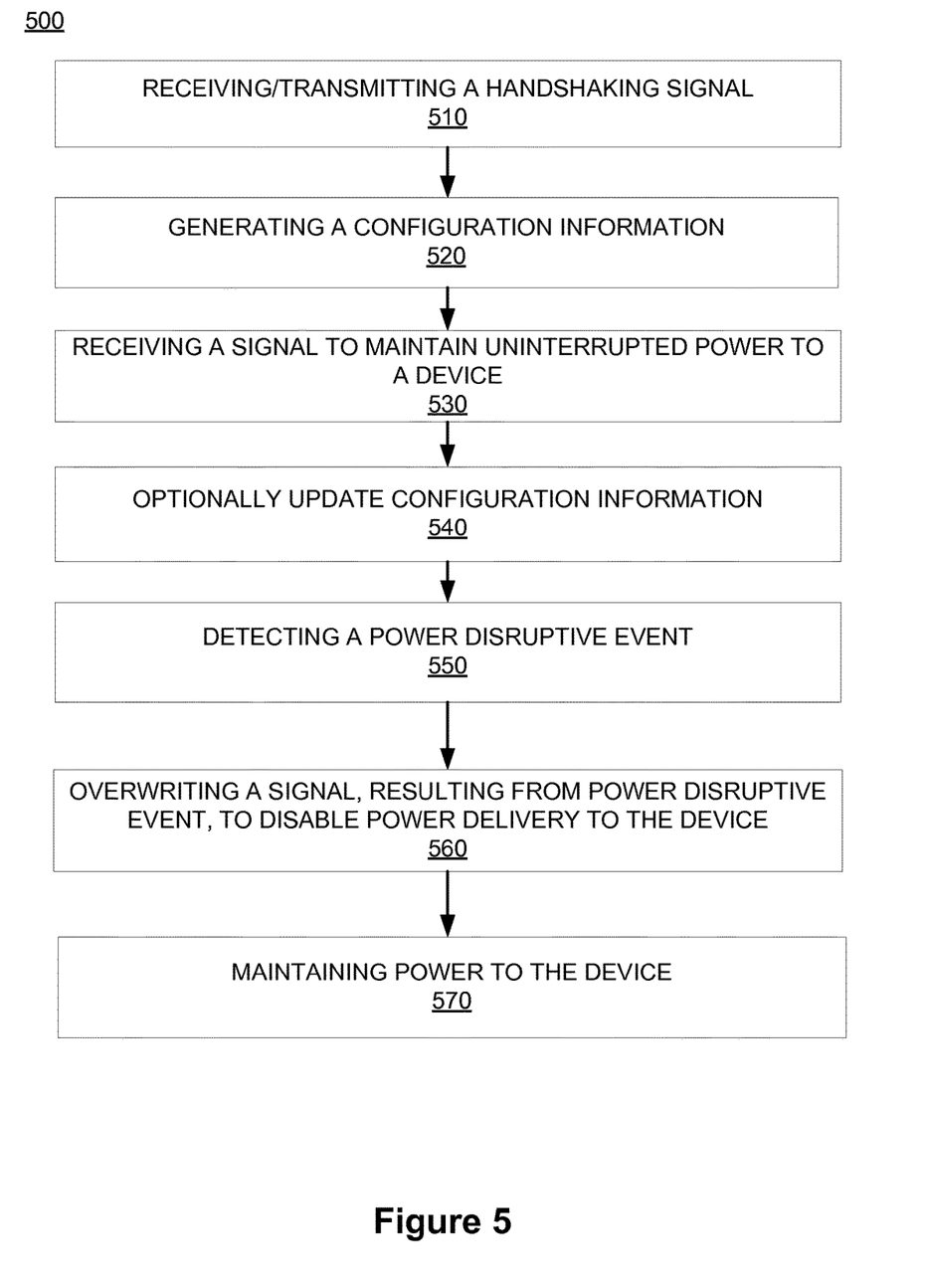
FIG. 5 shows an exemplary flow diagram for maintaining power to a critical device in accordance with one embodiment.

Referring now to FIG. 5, an exemplary flow diagram 500 for maintaining power to a critical device in accordance with one embodiment is shown. At step 510, handshaking signals are transmitted between the power source device and a device, e.g., device 120, 220, 320, 420, and/or 430, over power over Ethernet line. It is appreciated that handshaking signals may contain information regarding each device, its classification, power requirement, data path initialization, information regarding power source device, etc. At step 520, configuration information, e.g., file may be generated, and stored by the power source device.

At step 530, a signal indicating that uninterrupted power to a device is to be maintained is received. It is appreciated that the received signal may be in response to a user command, it may be initiated by the device itself, and/or initiated by another device on the network. At optional step 540, the configuration information may be updated based on the received signal to bypass any power disruptive event in order to maintain uninterrupted power to the device. At step 550, a power disruptive event may be received and detected. It is appreciated that a power disruptive event may include initialization of power source device, data path initialization, software update associated with the power source device, configuration of the power source device, re-configuration of the power source device, reset of the power source device, etc.

At step 560, a signal resulting from a power disruptive event is overwritten. The signal resulting from the power disruptive event disables power delivery to the device if it is not overwritten or bypassed. At step 570, power to the device is maintained regardless of the power disruptive event because the signal from the power disruptive event is overwritten. As such, the power source device as well as the device receiving power operate agnostic to the power disruptive event.

Accordingly, power to a sensitive device is maintained using a power source device that is coupled to the sensitive device via a power over Ethernet line without using an independent power system, e.g., battery. Moreover, power to a device is maintained despite power disruptive events, e.g., initialization, data path initialization, software update, configuration, re-configuration, power source device reset, etc.

Figure 6:
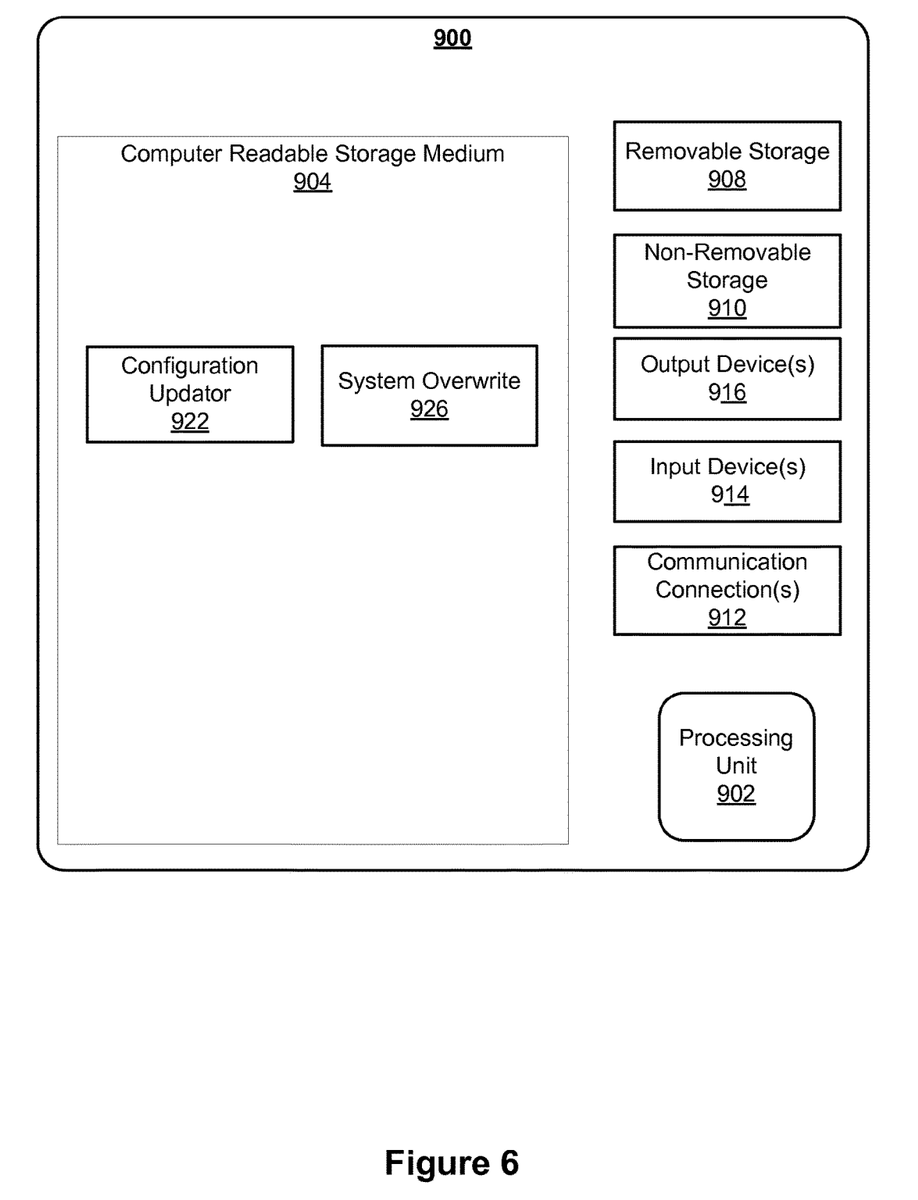
FIG. 6 shows an exemplary computer system in accordance with one embodiment.

Referring now to FIG. 6, a block diagram of an exemplary computer system in accordance with one embodiment of the present invention is shown. With reference to FIG. 6, an exemplary system module for implementing embodiments includes a general purpose computing system environment, such as computing system environment 900. Computing system environment 900 may include, but is not limited to, servers, switches, routers, desktop computers, laptops, tablets, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed facilitate maintaining power for a critical device and/or overwriting a disruptive power event in accordance with embodiments herein (e.g., process 500).

Additionally, in various embodiments, computing system environment 900 may also have other features/functionality. For example, computing system environment 900 may also include additional storage (removable and/or non-removable) including, but not limited to, magnetic or optical disks or tape. Such additional storage is illustrated by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and nonremovable storage 910 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

In some embodiments, computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 912 may allow computing system environment 900 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 912 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 900 may also have input device(s) 914 such as keyboard, mouse, a terminal or terminal emulator (either connected or remotely accessible via telnet, SSH, http, SSL, etc.), pen, voice input device, touch input device, remote control, etc. Output device(s) 916 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, computer readable storage medium 904 includes a configuration updator 922 and a system overwrite module 926 operable to maintain uninterrupted power according to flow diagram 500, for instance.

It is appreciated that implementations according to embodiments of the present invention that are described with respect to a computer system are merely exemplary and not intended to limit the scope of the present invention. For example, embodiments of the present invention may be implemented on devices such as switches and routers, which may contain application specific integrated circuits (ASICs), field programmable gate arrays (FPGAs), etc. It is appreciated that these devices may include a computer readable medium for storing instructions for implementing a method according to flow diagram 500.

Figure 7:
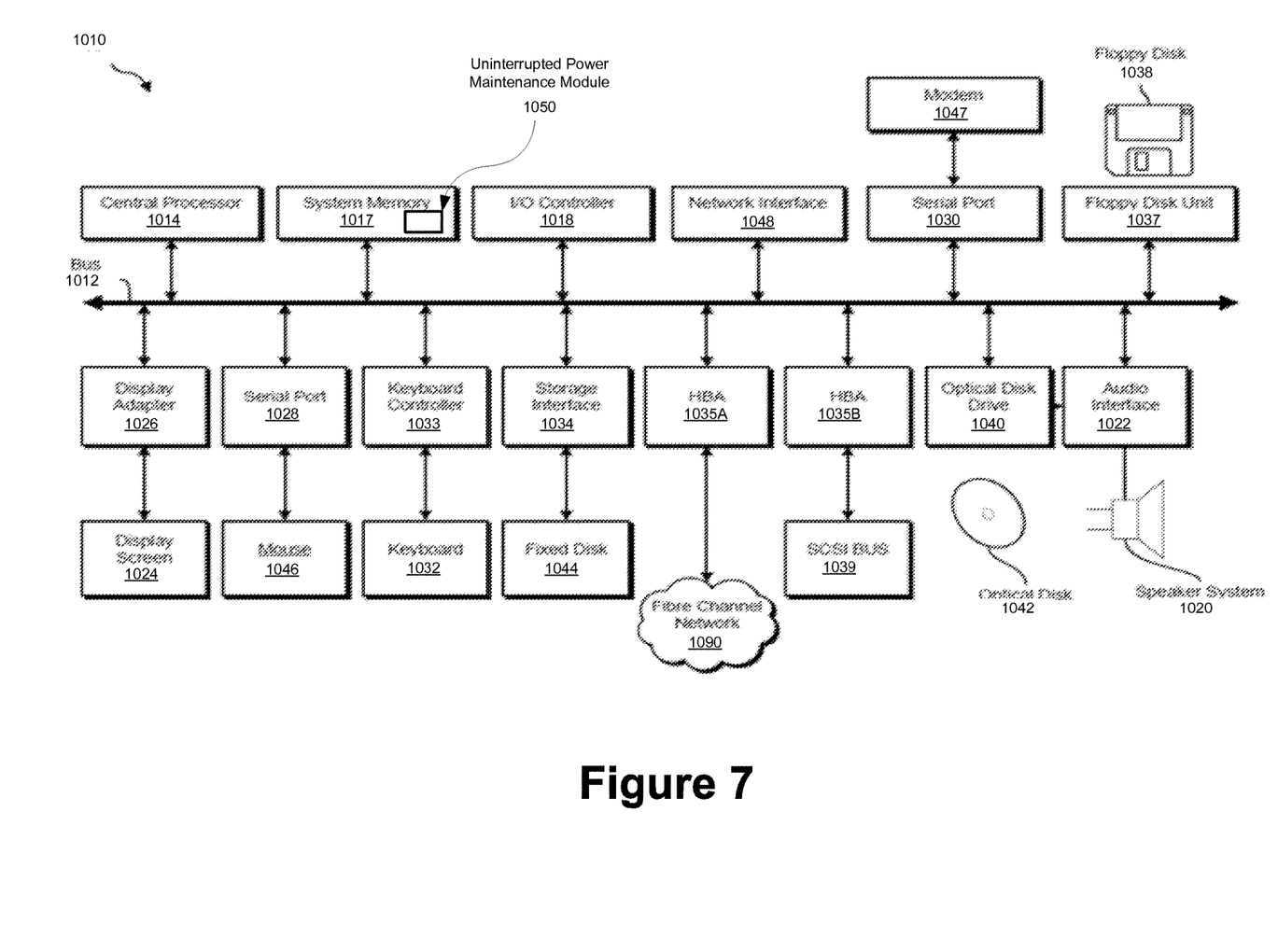
FIG. 7 shows a block diagram of another exemplary computer system in accordance with one embodiment.

Referring now to FIG. 7, a block diagram of another exemplary computer system in accordance with one embodiment of the present invention is shown. FIG. 7 depicts a block diagram of a computer system 1010 suitable for implementing the present disclosure. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012). It is appreciated that the network interface 1048 may include one or more Ethernet ports, wireless local area network (WLAN) interfaces, etc., but are not limited thereto. System memory 1017 includes an uninterrupted power maintenance module 1050 which is operable to maintain and provide uninterrupted power to a critical device. According to one embodiment, the uninterrupted power maintenance module 1050 may include other modules for carrying out various tasks. For example, uninterrupted power maintenance module 1050 may include the configuration updator 922 module and the system overwrite module 926, as discussed with respect to FIG. 6 above. It is appreciated that the uninterrupted power maintenance module 1050 may be located anywhere in the system and is not limited to the system memory 1017. As such, residing of the uninterrupted power maintenance module 1050 within the system memory 1017 is merely exemplary and not intended to limit the scope of the present invention. For example, parts of the uninterrupted power maintenance module 1050 may reside within the central processor 1014 and/or the network interface 1048 but are not limited thereto.

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Network interface 1048 may provide multiple connections to other devices. Furthermore, modem 1047 may provide a direct connection to a remote server via a telephone link or to the Internet via an internet service provider (ISP). Network interface 1048 may provide one or more connection to a data network, which may include any number of networked devices. It is appreciated that the connections via the network interface 1048 may be via a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method comprising:
   receiving a signal, at a power source device, wherein the power source is configured to supply power to another device, wherein said signal indicates that uninterrupted power from said power source device to said another device over a line is to be maintained, wherein said line is configured to carry data and power, wherein said signal is received prior to a power disruptive event, and wherein said signal is generated in response to a user command;
   maintaining power to said another device over said line during said power disruptive event associated with said power source device, wherein said power to said another device over said line is interrupted in absence of said receiving said signal; and
   transmitting handshaking signals via said line coupling said another device to said power source device, wherein said received signal overwrites a handshaking scheme between said power source device and said another device, wherein said another device and said power source device remain agnostic to said power disruptive event.

2. The method as described by claim 1, wherein said power disruptive event comprises initialization of said data path and alteration to said data path associated with said line, and wherein said signal classifies said another device as a critical device, such that said signal is transmitted from said another device to said power source device.

3. The method as described by claim 1, wherein said power disruptive event further comprises at least one of: a power source device initialization, a power source device data path initialization, a power source device software update, a power source device configuration, a power source device re-configuration, and a power source device reset.

4. The method as described by claim 2, wherein said line is power over Ethernet.

5. The method as described by claim 1, wherein said power disruptive event is an event that occurs on said power source device, wherein said power disruptive event is not an event that occurs outside of said power source.

6. A device comprising:
   a controller;
   a port configured to couple said device to another device via a power over Ethernet line, wherein said power over Ethernet line is configured to carry data and power between said device and said another device; and
   a memory component operable to store configuration information associated with said another device,
   a switch coupled to said port, wherein said switch is operable to receive a disabling signal from said controller to disable carrying power of said power over Ethernet line to said another device in response to a power disruptive event, wherein said switch is operable to overwrite said disabling signal from said controller in response to an updated information;
   wherein said configuration information comprises power requirements associated with said another device,
   wherein said updated information is generated in response to receiving a signal, at the device, wherein the device is configure to supply power to said another device, wherein said signal indicates that uninterrupted power from said device to said another device over said power over Ethernet line is to be maintained regardless of said power disruptive event associated with said device, wherein said signal is received prior to said power disruptive event, wherein said signal is generated in response to a user command, wherein said signal classifies said another device as a critical device, and wherein said signal is transmitted from said another device to said device over said power over Ethernet line;
   wherein carrying said power from said device to said another device over said power over Ethernet line is interrupted in absence of said receiving said signal; and
   wherein handshaking signals are transmitted via said Ethernet line coupling said another device to said power source device, wherein said received signal overwrites a handshaking scheme between said power source device and said another device, wherein said another device and said power source device remain agnostic to said power disruptive event.

7. The device as described by claim 6, wherein said power disruptive event comprises initialization of a data path and alteration to a data path associated with said power over Ethernet line.

8. The device as described by claim 6, wherein said power disruptive event further comprises at least one of: a power source device initialization, a power source device data path initialization, a power source device software update, a power source device configuration, a power source device re-configuration, and a power source device reset.

9. The device as described by claim 6, wherein said power disruptive event is an event that occurs on said power source device, wherein said power disruptive event is not an event that occurs outside of said power source.

10. A non-transitory computer readable storage medium having stored thereon, computer executable instructions that cause the device to perform a method comprising:
   receiving a signal, at a power source device, wherein the power source device is configured to supply power to another external device, wherein said signal indicates that uninterrupted power from said power source device to said another external device over a power over Ethernet line is to be maintained, wherein said power over Ethernet line is configured to carry data and power, wherein said signal is received at said power source device prior to a power disruptive event associated with said power source device, wherein said signal is generated in response to a user command; and
   maintaining power to said another external device over said power over Ethernet line regardless of said power disruptive event, wherein carrying said power from said power source device to said another external device over said power over Ethernet line is interrupted in absence of said receiving said signal;

wherein said power disruptive event comprises at least one of: a power source device initialization, a power source device data path initialization, a power source device software update, a power source device configuration, a power source device re-configuration, and a power source device reset; and wherein handshaking signals are transmitted via said Ethernet line coupling said another external device to said power source device, wherein said received signal overwrites a handshaking scheme between said power source device and said another external device, wherein said another external device and said power source device remain agnostic to said power disruptive event.

11. The computer readable storage medium as described by claim 10, wherein said method further comprises:
generating a configuration information associated with said device, wherein said configuration information comprises power requirements associated with said device; and
generating an updated information associated with said device in response to receiving said signal to maintain uninterrupted power to said device over said power over Ethernet line regardless of said power disruptive event, wherein said updated information maintains uninterrupted power to said device.

12. The computer readable storage medium as described by claim 10 further comprising:
overwriting a disabling signal from a controller to disable carrying power on said power over Ethernet line to said device, wherein said overwriting is in response to said signal to maintain uninterrupted power to said device.

13. The computer readable storage medium as described by claim 10, wherein said signal classifies said device as a critical device.

14. The computer readable storage medium as described by claim 10, wherein said another external device is a critical external device.

15. The computer readable storage medium as described by claim 10, wherein said another external device is not connected to an independent power system.

16. The computer readable storage medium as described by claim 10, wherein said method further comprises:
receiving another signal, at said another external device, wherein said another signal indicates that a disabling signal to disable power to said another device is to be overwritten, and uninterrupted power from said power source device to said another external device over a power over Ethernet line is to be maintained.

17. The computer readable storage medium as described by claim 10, wherein said method further comprises:
receiving a disabling signal, at said another external device, to disable power to said another device, wherein said disabling signal is ignored, and uninterrupted power from said power source device to said another external device over a power over Ethernet line is maintained.

18. The computer readable storage medium as described by claim 10, wherein said power disruptive event is an event that occurs on said power source device, wherein said power disruptive event is not an event that occurs outside of said power source.

* * * * *